United States Patent
Yuan et al.

(10) Patent No.: US 11,831,386 B2
(45) Date of Patent: Nov. 28, 2023

(54) METHOD, DEVICE AND COMPUTER READABLE MEDIUM FOR BEAM FAILURE RECOVERY FOR SECONDARY CELL

(71) Applicant: NEC CORPORATION, Tokyo (JP)

(72) Inventors: Fang Yuan, Beijing (CN); Lin Liang, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/266,817

(22) PCT Filed: Aug. 9, 2018

(86) PCT No.: PCT/CN2018/099704
§ 371 (c)(1),
(2) Date: Feb. 8, 2021

(87) PCT Pub. No.: WO2020/029203
PCT Pub. Date: Feb. 13, 2020

(65) Prior Publication Data
US 2021/0344405 A1 Nov. 4, 2021

(51) Int. Cl.
*H04B 7/08* (2006.01)
*H04W 76/19* (2018.01)
*H04W 72/1263* (2023.01)
*H04W 80/02* (2009.01)
*H04W 72/23* (2023.01)

(52) U.S. Cl.
CPC ........ *H04B 7/088* (2013.01); *H04W 72/1263* (2013.01); *H04W 72/23* (2023.01); *H04W 76/19* (2018.02); *H04W 80/02* (2013.01)

(58) Field of Classification Search
CPC .......................... H04B 7/088; H04W 72/1263
See application file for complete search history.

(56) References Cited

U.S. PATENT DOCUMENTS

2017/0026938 A1 1/2017 Onggosanusi et al.
2020/0322035 A1* 10/2020 Shi ........................ H04B 7/0639

FOREIGN PATENT DOCUMENTS

WO   2018/136300 A1   7/2018
WO   2019/119399 A1   6/2019

OTHER PUBLICATIONS

"BFR on SCell", InterDigital Inc., 3GPP TSG-RAN WG2, May 21-25, 2018, RAN2#102, R2-1806821, pp. 1-2 (2 pages total).
(Continued)

*Primary Examiner* — Sulaiman Nooristany
(74) *Attorney, Agent, or Firm* — Sughrue Mion, PLLC

(57) ABSTRACT

Embodiments of the present disclosure relate to methods, devices and computer readable media for beam failure recovery for a secondary cell. In example embodiments, a method implemented in a terminal device includes in response to a beam failure on a secondary cell (Scell), transmitting a scheduling request to a network device; receiving, from the network device and on a primary cell (Pcell), a response indicating a resource allocated to the terminal device; transmitting, to the network device and using the allocated resource, a beam failure recovery request comprising a beam index of a beam selected from available beams on the Scell by the terminal device, to recover communication between the terminal device and the network device via the selected beam on the Scell.

5 Claims, 12 Drawing Sheets

(56) References Cited

OTHER PUBLICATIONS

"Remaining Issues on Beam Failure Recovery", China Telecom, 3GPP TSG RAN WG1, Aug. 20-24, 2018, Meeting #94, R1-1808289, pp. 1-3 (3 pages total).
Supplementary European Search Report dated Feb. 25, 2022 in European Application No. 18929633.8.
"RAN2 aspects of DL beam management", Huawei, HiSilicon, 3GPP TSG-RAN WG2 Meeting NR#2, R2-1706718, Jun. 27-29, 2017, 4 pages, Qingdao, China.
"SCell Beam Failure Recovery", Nokia, Nokia Shanghai Bell, 3GPP TSG-RAN WG2 Meeting #101bis, R2-1805342, Apr. 16-20, 2018, 3 pages, Sanya, China.
International Search Report for PCT/CN2018/099704 dated May 9, 2019 (PCT/ISA/210).
Written Opinion for PCT/CN2018/099704 dated May 9, 2019 (PCT/ISA/237).
Huawei et al., "non-contention based random access for beam failure recovery in CA", 3GPP TSG-RAN WG2#AH-1801, R2-1801049, Vancouver, Canada, Jan. 22-26, 2018 (3 pages total).
Qualcomm Incorporated, "Remaining details on RACH procedure", 3GPP TSG-RAN WG1 Meeting RAN1 92, R1-1802814, Athens, Greece, Feb. 26-Mar. 2, 2018 (13 pages total).
NEC, "Remaining issues on beam failure recovery", 3GPP TSG RAN WG1 Meeting #92b, R1-1803622, Sanya, China, Apr. 16-20, 2018 (2 pages total).
InterDigital Inc., "BFR on SCell", 3GPP TSG-RAN WG2, RAN2#102, R2-1806821, Busan, Republic of Korea, May 21-25, 2018 (2 pages total).
Huawei et al., "RAN2 aspects of DL beam management", 3GPP TSG-RAN WG2 Meeting NR#2, R2-1706718, Qingdao, China, Jun. 27-29, 2017 (4 pages total).
Notification of Reasons for Refusal dated Aug. 30, 2022 from the Japanese Patent Office in JP Application No. 2021-507029.

* cited by examiner

METHOD, DEVICE AND COMPUTER READABLE MEDIUM FOR BEAM FAILURE RECOVERY FOR SECONDARY CELL

TECHNICAL FIELD

Embodiments of the present disclosure generally relate to the field of communication, and in particular, to methods, devices and computer readable media for beam failure recovery for a secondary cell.

BACKGROUND

New radio access system, which is also called NR system or NR network, is the next generation communication system. It has been agreed that carrier aggregation (CA) which is used in Long Term Evolution (LTE)-Advanced to increase the bandwidth will be supported in the NR system. Each aggregated carrier is referred to as a component carrier (CC). When CA is used, there are a number of serving cells, one for each CC. Generally, a primary cell (Pcell) corresponding to a primary CC and at least one secondary cell (Scell) corresponding to at least one secondary CC are provided.

A beam failure may occur when the quality of beam pair(s) of a serving cell falls low enough (for example, comparison with a threshold or time-out of an associated timer). Beam failure recovery is a mechanism for recovering beams when all or part of beams serving a terminal device has failed. In RAN2 #90 meeting for the 3GPP working group, it was already agreed that the beam failure recovery is supported in the same carrier case of CA. However, there still remain questions regarding the beam failure recovery for the Scell.

SUMMARY

In general, example embodiments of the present disclosure provide methods, devices and computer readable media for beam failure recovery for a secondary cell.

In a first aspect, there is provided a method implemented in a terminal device. The method comprises in response to a beam failure on a Scell, transmitting a scheduling request to a network device; receiving, from the network device and on a Pcell, a response indicating a resource allocated to the terminal device; transmitting, to the network device and using the allocated resource, a beam failure recovery request comprising a beam index of a beam selected from available beams on the Scell by the terminal device, to recover communication between the terminal device and the network device via the selected beam on the Scell.

In a second aspect, there is provided a method implemented in a terminal device. The method comprises in response to a beam failure on a Scell, determining a random access preamble to be transmitted, the random access preamble indicating a Scell index of the Scell; transmitting the random access preamble to a network device; receiving, from the network device and on a Pcell, downlink control information including a request for channel state information (CSI) reporting for the Scell; and transmitting, to the network device, a beam index of a beam selected from available beams on the Scell by the terminal device, to recover communication between the terminal device and the network device via the selected beam on the Scell.

In a third aspect, there is provided a method implemented in a terminal device. The method comprises in response to a beam failure on a Scell, determining a random access preamble to be transmitted, the random access preamble indicating a beam index of a beam selected from available beams on the Scell by the terminal device; transmitting the random access preamble to a network device and on the Scell, to trigger communication between the terminal device and the network device via the selected beam on the Scell.

In a fourth aspect, there is provided a method implemented in a terminal device. The method comprises in response to a beam failure on a Scell, determining an uplink control channel of a Pcell to be used, based on resources of the uplink control channel and uplink control information to be transmitted on the uplink control channel; and transmitting, to a network device and on the uplink control channel, a beam failure recovery request along with the uplink control information, the beam failure recovery request comprising a Scell index of the Scell and a beam index of a beam selected from available beams on the Scell by the terminal device, to recover communication between the terminal device and the network device via the selected beam on the Scell.

In a fifth aspect, there is provided a method implemented in a network device. The method comprises receiving a scheduling request from a terminal device; transmitting, to the terminal device and on a Pcell, a response indicating a resource allocated to the terminal device; receiving, from the terminal device and using the allocated resource, a beam failure recovery request comprising a beam index of a beam selected from available beams on a Scell by the terminal device, to communicate with the terminal device via the selected beam on the Scell.

In a sixth aspect, there is provided a method implemented in a network device. The method comprises receiving a random access preamble from a terminal device, the random access preamble indicating a Scell index of a Scell serving the terminal device; determining the Scell from the random access preamble; transmitting, to the terminal device and on a Pcell serving the terminal device, downlink control information including a request for CSI reporting for the Scell; and receiving, from the terminal device, a beam index of a beam selected from available beams on the Scell by the terminal device, to communicate with the terminal device via the selected beam on the Scell.

In a seventh aspect, there is provided a method implemented in a network device. The method comprises receiving a random access preamble from a terminal device and on a Scell serving the terminal device, the random access preamble indicating a beam index of of a beam selected from available beams on the Scell by the terminal device; and determining the beam index from the random access preamble, to communicate with the terminal device via the selected beam on the Scell.

In an eighth aspect, there is provided a method implemented in a network device. The method comprises receiving, from a terminal device and on an uplink control channel of a Pcell serving the terminal device, a beam failure recovery request along with uplink control information; and obtaining, from the beam failure recovery request, a Scell index of a Scell serving the terminal device and a beam index of a beam selected from available beams on the Scell by the terminal device, to communicate with the terminal device via the selected beam on the Scell.

In a ninth aspect, there is provided a terminal device. The device includes a processor; and a memory coupled to the processing unit and storing instructions thereon, the instructions, when executed by the processing unit, causing the device to perform the method according to the first aspect.

In a tenth aspect, there is provided a terminal device. The device includes a processor; and a memory coupled to the processing unit and storing instructions thereon, the instructions, when executed by the processing unit, causing the device to perform the method according to the second aspect.

In a eleventh aspect, there is provided a terminal device. The device includes a processor; and a memory coupled to the processing unit and storing instructions thereon, the instructions, when executed by the processing unit, causing the device to perform the method according to the third aspect.

In a twelfth aspect, there is provided a terminal device. The device includes a processor; and a memory coupled to the processing unit and storing instructions thereon, the instructions, when executed by the processing unit, causing the device to perform the method according to the fourth aspect.

In a thirteenth aspect, there is provided a network device. The device includes a processor; and a memory coupled to the processing unit and storing instructions thereon, the instructions, when executed by the processing unit, causing the device to perform the method according to the fifth aspect.

In a fourteenth aspect, there is provided a network device. The device includes a processor; and a memory coupled to the processing unit and storing instructions thereon, the instructions, when executed by the processing unit, causing the device to perform the method according to the sixth aspect.

In a fifteenth aspect, there is provided a network device. The device includes a processor; and a memory coupled to the processing unit and storing instructions thereon, the instructions, when executed by the processing unit, causing the device to perform the method according to the seventh aspect.

In a sixteenth aspect, there is provided a network device. The device includes a processor; and a memory coupled to the processing unit and storing instructions thereon, the instructions, when executed by the processing unit, causing the device to perform the method according to the eighth aspect.

In a seventeenth aspect, there is provided a computer readable medium having instructions stored thereon, the instructions, when executed on at least one processor, causing the at least one processor to carry out the method according to the first aspect.

In a eighteenth aspect, there is provided a computer readable medium having instructions stored thereon, the instructions, when executed on at least one processor, causing the at least one processor to carry out the method according to the second aspect.

In a nineteenth aspect, there is provided a computer readable medium having instructions stored thereon, the instructions, when executed on at least one processor, causing the at least one processor to carry out the method according to the third aspect.

In a twentieth aspect, there is provided a computer readable medium having instructions stored thereon, the instructions, when executed on at least one processor, causing the at least one processor to carry out the method according to the fourth aspect.

In a twenty-first aspect, there is provided a computer readable medium having instructions stored thereon, the instructions, when executed on at least one processor, causing the at least one processor to carry out the method according to the fifth aspect.

In a twenty-second aspect, there is provided a computer readable medium having instructions stored thereon, the instructions, when executed on at least one processor, causing the at least one processor to carry out the method according to the sixth aspect.

In a twenty-third aspect, there is provided a computer readable medium having instructions stored thereon, the instructions, when executed on at least one processor, causing the at least one processor to carry out the method according to the seventh aspect.

In a twenty-fourth aspect, there is provided a computer readable medium having instructions stored thereon, the instructions, when executed on at least one processor, causing the at least one processor to carry out the method according to the eighth aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
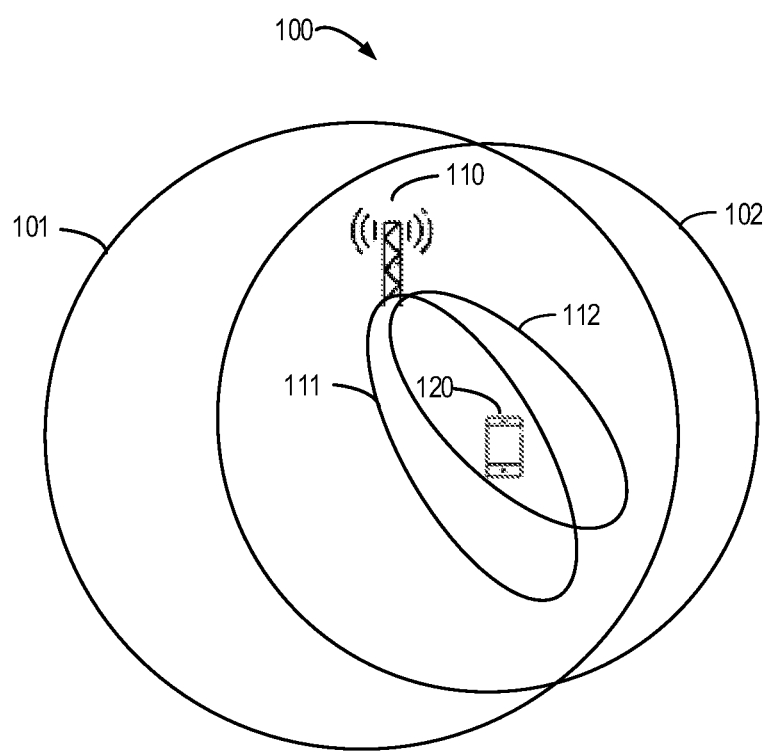
FIG. 1 is a schematic diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As mentioned above, a beam failure may occur when the quality of beam pair(s) of a serving cell falls low enough. A mechanism to recover from a beam failure may be triggered when the beam failure occurs. The beam failure recovery mechanism on terminal device side usually includes the following operations: beam failure detection, identification of a new beam, transmission of a beam failure recovery request and monitoring a response to the beam failure recovery request from a network device. In 3GPP specifications TS 38.214 and 38.321, the beam failure recovery (BFR) procedure for Pcell has been specified as follows:

(a) the terminal device initiates a dedicated PRACH transmission in Pcell to the network device on contention-free physical random access channel (CFRA) as the BFR request, and the PRACH preamble index is associated with a new candidate beam index identified by the terminal device;

(b) after receiving the PRACH transmission, the network device sends BFR request response on a dedicated control resource set (CORESET-BFR) to the terminal device, and the terminal device shall monitor CORESET-BFR for BFR request response.

Herein, the PRACH preamble is also referred as random access preamble.

However, this procedure does not work for beam failure recovery for Scell. Different from beam failure recovery for Pcell, media access control element (MAC CE) can be used in beam failure recovery for Scell since the link on Pcell can work when the beam fails in Scell. When MAC CE is used for beam failure recovery, there may be a problem of how to indicate the new beam if there is no physical uplink shared channel (PUSCH) resource to transmit MAC CE.

Conventionally, buffer status report (BSR) is transmitted using the remaining bits (padding bits) of a PUSCH. A possible solution to the above problem is to use the physical uplink control channel (PUCCH) resources. There are several symbols for a PUCCH format and the PUCCH resources are determined by the size of uplink control information (UCI) and acknowledge resource indicator (ARI). Thus, there may be remaining resources on the PUCCH which are not used to transmit the UCI. For example, if UE transmit the UCI using PUCCH format 1 or PUCCH format 3 in a PUCCH resource that includes $M_{RB}^{PUCCH}$ physical resource blocks (PRB), the UE determines a number of PRBs $M_{RB,min}^{PUCCH}$ for the PUCCH transmission to be the minimum number of PRBs. Therefore, the remaining number of PRBs may be determined based on $M_{RB}^{PUCCH}$ and $M_{RB}^{PUCCH}$. The inventors of the present application have realized that the remaining resources on the PUCCH which are not used to transmit the UCI may be used for the beam failure recovery for the Scell.

Embodiments of the present disclosure provide a solution for beam failure recovery. The solution for beam failure recovery in accordance with embodiments of the present disclosure can be adapted to the beam failure occurring on the Scell. Moreover, embodiments of the present disclosure specify the procedures for the beam failure recovery using MAC CE and can solve the above problem and one or more of other potential problems.

Principle and implementations of the present disclosure will be described in detail below with reference to FIGS. 1-18.

FIG. 1 shows an example communication network 100 in which embodiments of the present disclosure can be implemented. The network 100 includes a network device 110 and a terminal device 120 served by the network device 110. The network 100 may provide one or more serving cells 101, 102 to serve the terminal device 120, with each serving cell corresponding to a CC. It is to be understood that the number of network devices, terminal devices and serving cells is only for the purpose of illustration without suggesting any limitations. The network 100 may include any suitable number of network devices, terminal devices and serving cells adapted for implementing embodiments of the present disclosure.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

CA can be supported in the network 100, in which two or more CCs are aggregated in order to support a broader bandwidth. In CA, the network device 110 may provide to the terminal device 120 a plurality of serving cells including one Pcell 101 and at least one SCell 102. The terminal device 120 can establish Radio Resource Control (RRC) connection with the network device 110 on the Pcell 101. The Scell 102 can provide additional radio resources once the RRC connection between the network device 110 and the terminal device 120 is established and the Scell 102 is activated via higher layer signaling.

It is to be understood that the configuration of Pcell 101 and Scell 102 shown in FIG. 1 is only for the purpose of illustration without suggesting any limitations. Pcell 101 and Scell 102 may be in other configuration than that shown in FIG. 1.

In some other scenarios, for example, the terminal device 120 may establish connections with two groups of CCs (not shown in FIG. 1) and thus can utilize more radio resources. The two groups of CCs may be respectively defined as a master group of CCs and a secondary group of CCs. The master group of CCs may provide a group of serving cells, which are also referred to as "Master Cell Group (MCG)". The secondary group of CCs may also provide a group of serving cells, which are also referred to as "Secondary Cell Group (SCG)". For dual connectivity operation, a term "Special Cell (SpCell)" may refer to the Pcell of the MCG or the primary Scell (PScell) of the SCG depending on if the terminal device 120 is associated to the MCG or the SCG, respectively. In other cases than the dual connectivity operation, the term "SpCell" may also refer to the Pcell. Although Pcell is illustrated as examples, embodiments of the present disclosure may be also applicable to both groups of dual connectivity configuration.

In embodiments, the network device 110 is configured to implement beamforming technique and transmit signals to the terminal device 120 via a plurality of beams. The terminal device 120 is configured to receive the signals transmitted by the network device 110 via the plurality of beams. There may be different beams associated with the Pcell 101 and the Scell 102. As shown in FIG. 1, DL beams 111 and 112 are associated with the Scell 102. It is to be understood that the Scell 102 may have more beams associated therewith. Although not shown, the Pcell 101 may also have beams associated therewith.

As mentioned above, a beam failure may occur on the Scell 102. For example, the network device 110 may be configured to transmit a signal via the beam 112 and the terminal device 120 may detect a beam failure of the beam 112. Then, a beam failure recovery procedure may be initiated. Specifically, the terminal device 120 may identify a new beam for recovery from the beam failure. For example, the terminal device 120 may select a beam 111 from available beams on the Scell 102 as a new candidate beam, for example, based on the qualities of the available beams. For ease of discussion, the new beam identified by the terminal device 120 is hereinafter referred to as the selected beam 111.

The terminal device 120 may include information on the selected beam 111 in a beam failure recovery request. The terminal device 120 may then transmit the beam failure recovery request to the network device 110, such that the network device 110 communicates with the terminal device 120 via the selected beam 111 of the Scell 120.

Implementations of the present disclosure will be described in detail below with reference to FIGS. 2-17. FIGS. 2-6 illustrate example methods according to some embodiments of the present disclosure implemented at a terminal device. It is to be understood that the methods shown may include additional acts not shown and/or may omit some shown acts, and the scope of the present disclosure is not limited in this regard.

Figure 2:
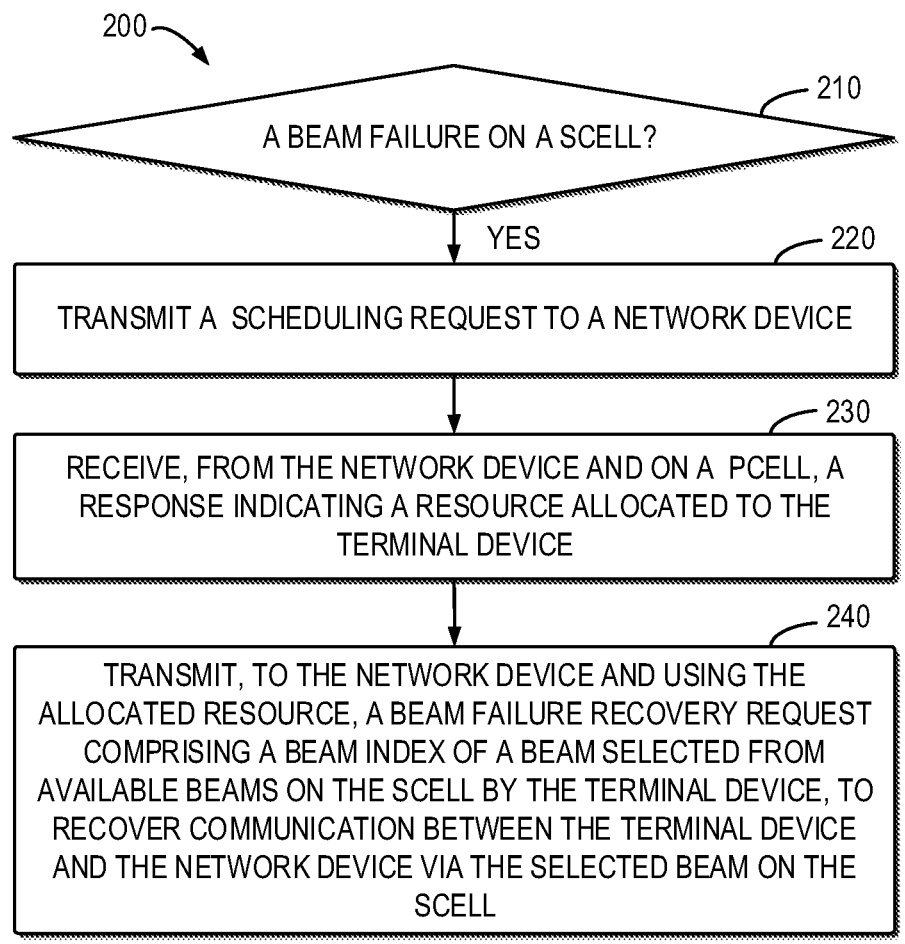
FIG. 2 illustrates a flowchart of a method in accordance with some embodiments of the present disclosure.

FIG. 2 illustrates a flowchart of an example method 200 for beam failure recovery for a Scell in accordance with some embodiments of the present disclosure. The method 200 can be implemented at the terminal device 120 shown in FIG. 1. For the purpose of discussion, the method 200 will be described with reference to FIG. 1.

At 210, the terminal device 120 determines whether there is a beam failure on a Scell. If the terminal device 120 determines a beam failure on the Scell 102, the terminal device 120 at 220 transmits a scheduling request to a network device, for example, the network device 110.

The scheduling request may be a PRACH transmission on PRACH channel of the Pcell 101 or the Scell 102. In such cases, the preamble of PRACH transmission may be based on CFRA or contention-based random access (CBRA). Alternatively, the scheduling request may be a scheduling request (SR) transmitted on the PUCCH of the Pcell 101.

At 230, the terminal device 120 receives from the network device 110 and on a Pcell (e.g. the Pcell 101), a response indicating a uplink resource allocated to the terminal device 120. The response may be transmitted on physical downlink control channel (PDCCH) of the Pcell 101 and may comprise downlink control information (DCI) indicating a UL grant on physical uplink shared channel (PUSCH). Depending on the type of the scheduling request transmitted at 220, the response may be scrambled by different types of Radio Network Temporary Identifier (RNTI), such as random access-RNTI (RA-RNTI) determined by the PRACH transmission occasion or cell-RNTI (C-RNTI) allocated to terminal device.

At 240, the terminal device 120 transmits, to the network device 110 and using the allocated resource, a beam failure recovery request comprising a beam index of a new beam selected from available beams on the Scell by the terminal device, to recover communication between the terminal device and the network device via the selected beam on the Scell. For example, the terminal device 120 may include the beam failure recovery request in MAC CE and transmit the MAC CE using the resource allocated by the network device 110, e.g. on the PUSCH.

The beam failure recovery request may comprise the beam index of the selected beam 111 and the Scell index of the Scell 102. Accordingly, the structure of MAC CE can be designed as in show in Table 1. The field "LGID" indicates that the MAC CE is for beam failure recovery, the field "Serving Cell ID" indicates the Scell index with beam failure, and the field "RS ID" indicates the beam index of the new beam. It is to be noted that in the case where the scheduling request is transmitted on the Scell 102, the Scell index may be omitted. Although not shown, there may be reserved bits in the MAC-CE structure to align the length of MAC-CE information to an integer number of bytes.

TABLE 1

| MAC CE for BFR | | |
|---|---|---|
| LGID | Serving Cell ID | RS ID |

As mentioned above, the scheduling request may be a PRACH transmission or scheduling request on PUCCH. The embodiments where the scheduling request is a PRACH transmission and the embodiments where the scheduling request on PUCCH is a scheduling request will be described below with respect to FIGS. 11-13.

In some embodiments, after transmitting the beam failure recovery request at 240, the terminal device 120 may monitor downlink control information in both PDCCH of the Pcell 101 and the Scell 102 during a timing window (also referred to as BFR-RA-window herein) for beam failure recovery request response. The terminal device 120 may initiate a timer for the BFR-RA-window, for example, several slots after transmitting the beam failure recovery request at 240, and the timer expires when the duration of BFR-RA-window ends. If a downlink control information in PDCCH for rescheduling the transmitted PUSCH which contains the beam failure recovery request in MAC CE is received from the network before the timer expires, then the terminal device 120 may retransmit the PUSCH containing the beam failure recovery request in MAC CE to the network device 110, and restart the timer for the BFR-RA-window to monitor beam failure recovery request response.

The BFR-RA-window may have a predetermined duration. If the timer has expired or the BFR-RA-window ends, but no response to the beam failure recovery request has been received, then the terminal device 120 may terminate the beam failure recovery procedure, without retransmitting the beam failure request to the network device 110. The terminal device 120 may further indicate to the higher layer an unsuccessful beam failure recovery event.

Alternatively, the BFR-RA-window may be initiated by receiving an acknowledge message from the network device 110. For example, the terminal device 120 may receive a message which explicitly acknowledges the reception of the PUSCH transmitted at 240. After that, the terminal device 120 may initiate or start the BFR-RA-window.

In the embodiments described above, the scheduling request procedure may be a normal procedure which can be reused for other purpose, e.g., the PRACH transmission and the selected PRACH preamble can be used for uplink synchronization. In some embodiments, a dedicated procedure, such as a dedicated PRACH transmission, may be used only for the purpose of beam failure recovery, which will be described below with respect to FIGS. 3 and 4.

Figure 3:
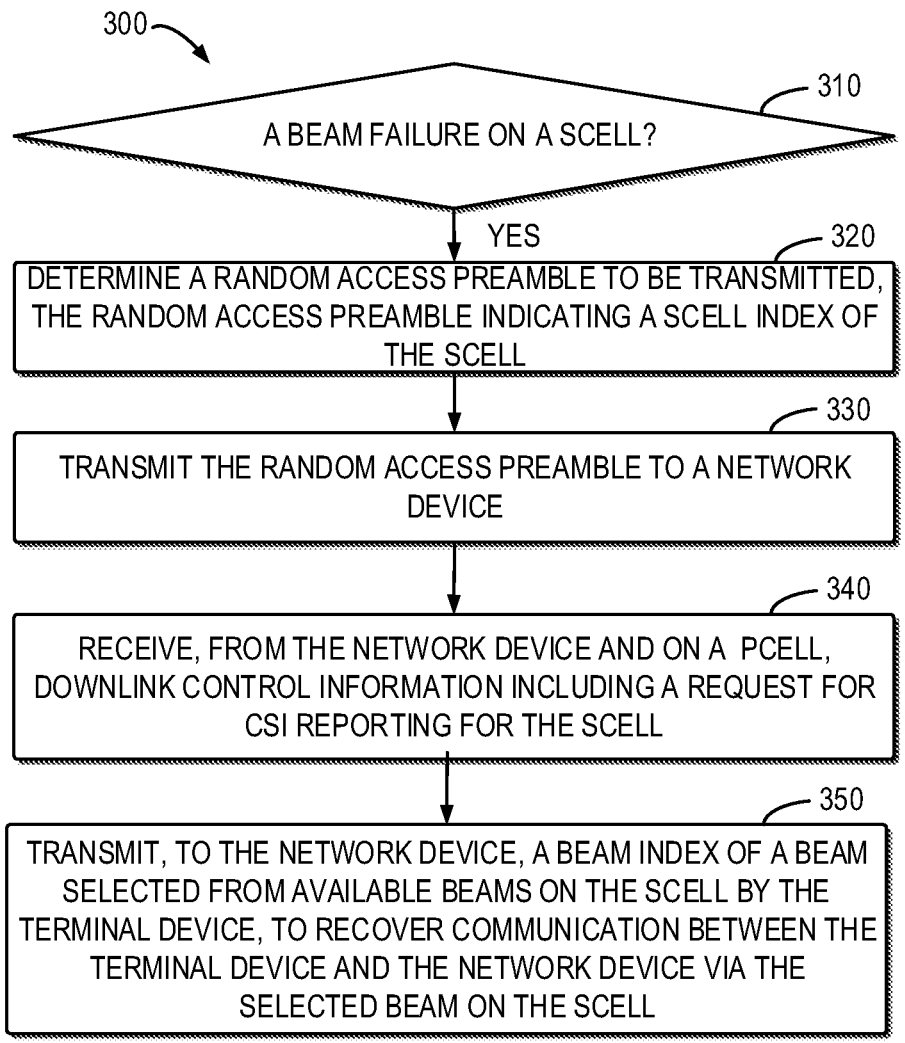
FIG. 3 illustrates a flowchart of a method in accordance with some embodiments of the present disclosure.

FIG. 3 illustrates a flowchart of an example method 300 for beam failure recovery for a Scell in accordance with some embodiments of the present disclosure. The method 300 can be implemented at the terminal device 120 shown in FIG. 1. For the purpose of discussion, the method 300 will be described with reference to FIG. 1.

At 310, the terminal device 120 determines whether there is a beam failure on a Scell. If the terminal device 120 determines a beam failure on the Scell 102, the terminal device 120 at 320 determines a PRACH preamble to be transmitted, from a set of dedicated preambles. The PRACH preamble index indicates a Scell index of the Scell 102. For example, the terminal device 120 may determine the PRACH preamble based on a predefined mapping relation between the PRACH preamble indices and the at least one Scell provided by the network device 110. The PRACH preambles can be contention free based.

At 330, the terminal device 120 transmits the PRACH preamble determined at 320 to a network device 110. For example, the terminal device 120 may initiate a dedicated PRACH transmission to the network device 110 with the PRACH preamble determined at 320. The terminal device 120 may transmit the preamble on PRACH channel of the Pcell 101.

At 340, the terminal device 120 receives, from the network device 110 and on a Pcell, downlink control information including a request for CSI reporting for the Scell 102. The downlink control information may be scrambled with the C-RNTI of the terminal device and received on a CORESET-BFR which is a control resource set used dedicatedly for beam failure recovery.

At 350, the terminal device 120 transmits, to the network device 110 and in response to the CSI request, a beam index of a beam selected from available beams on the Scell 102 by the terminal device 120, to recover communication between the terminal device 120 and the network device 110 via the selected beam on the Scell 102. For example, the terminal device 120 may include the beam index of the selected beam 111 in a CSI report and transmit the CSI report on the PUSCH of the Pcell 101 according to the CSI request.

In such embodiments, the Scell index is implicitly indicated by the PRACH preamble index in a PRACH transmission and then the beam index is explicitly included in the CSI report. Therefore, the terminal device 120 may notify the network device 110 of the Scell on which a beam failure has occurred with the Scell index indicated by the PRACH preamble transmitted at 330, and notify the network device 110 of the candidate beam with the beam index of the selected beam 111 transmitted at 350.

In some embodiments, the terminal device 120 may receive from the network device 110 a response to the beam failure recovery request (also referred to as BFR response) after the CSI report. The BFR response is for link reconfiguration of Scell based on the reported beam index, and may be received either on the Pcell 101 or on the Scell 102.

In the embodiments described with respect to FIG. 3, the beam failure recovery procedure may utilize a PRACH preamble which is deliberately selected and thus indicates index information on the Scell. In this way, the explicit transmission of the Scell index may be omitted. Thus, the overhead for the beam failure recovery can be reduced.

Figure 4:
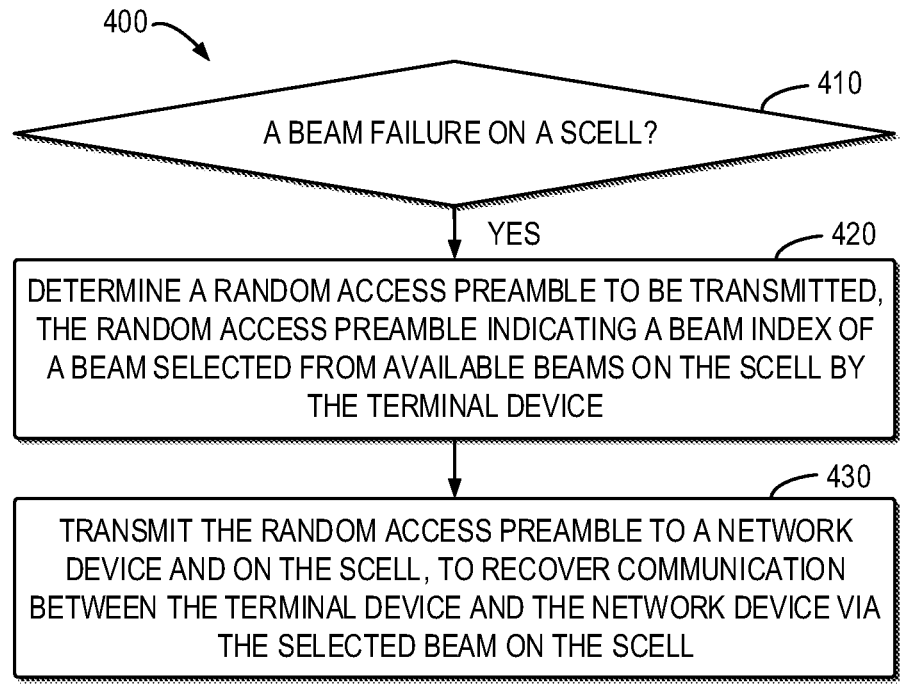
FIG. 4 illustrates a flowchart of a method in accordance with some embodiments of the present disclosure.

FIG. 4 illustrates a flowchart of an example method 400 for beam failure recovery for a Scell in accordance with some embodiments of the present disclosure. The method 400 can be implemented at the terminal device 120 shown in FIG. 1. For the purpose of discussion, the method 400 will be described with reference to FIG. 1.

At 410, the terminal device 120 determines whether there is a beam failure on a Scell. If the terminal device 120 determines a beam failure on the Scell 102, the terminal device 120 at 420 determines a PRACH preamble to be transmitted. The PRACH preamble index indicates a beam index of a beam selected from available beams on the Scell 102 by the terminal device 120. For example, the terminal device 120 may determine the PRACH preamble to be transmitted based on a predefined mapping relation between the PRACH preambles dedicated for beam failure recovery purpose and a plurality of beams associate with the Scell 102.

At 430, the terminal device 120 transmits the PRACH preamble to a network device and on the Scell 102, to recover communication between the terminal device 120 and the network device 110 via the selected beam 111 on the Scell 102. For example, the terminal device 120 may initiate a dedicated PRACH transmission on the Scell 102 to a network device with PRACH preamble index determined at 410.

In such embodiments, since the PRACH preamble is transmitted on the Scell 102, the terminal device 120 may not need to transmit with the information on the Scell index. Since the beam index is implicitly indicated by the PRACH preamble, the terminal device 120 also may not explicitly transmit the information on the beam index. Therefore, by transmitting the PRACH preamble on the Scell through a dedicated PRACH procedure, the terminal device 120 may notify the network device 110 of the beam failure recovery in only one message.

In the embodiments described with respect to FIG. 4, the beam failure recovery procedure may utilize a PRACH transmission on the Scell and the PRACH preamble is deliberately selected and thus indicates information on the candidate beam. In this way, the explicit transmission of the Scell index and the beam index may be omitted. Thus, the overhead for the beam failure recovery can be further reduced.

As mentioned above, there may be situation where no PUSCH is available for the transmission of MAC CE and thus the beam failure recovery request cannot be transmitted. When PUCCH transmission is available, the remaining resources of a PUCCH may be used for beam failure recovery request.

Upon receiving data from the network device 110 and on a physical downlink shared channel (PDSCH) of the Pcell 101, the terminal device 120 may transmit to the network device 110 uplink control information (UCI), such as hybrid automatic repeat request (HARQ) ACK/NACK. The PUCCH resources configured for the terminal device 120 to transmit the UCI may be more than that required by the UCI. Therefore, the remaining resources of the PUCCH may be utilized by the terminal device 120 to transmit the beam failure recovery request, i.e. to pad the beam failure recovery request in PUCCH.

Figure 5:
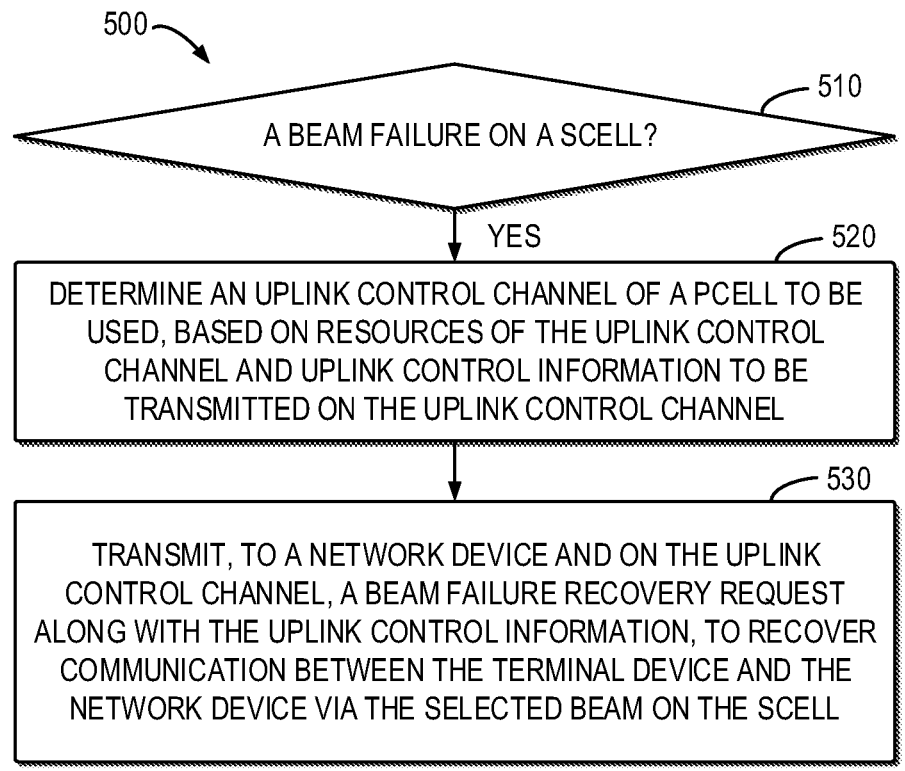
FIG. 5 illustrates a flowchart of a method in accordance with some embodiments of the present disclosure.

FIG. 5 illustrates a flowchart of an example method 500 for beam failure recovery for a Scell in accordance with some embodiments of the present disclosure. The method 500 can be implemented at the terminal device 120 shown in FIG. 1. For the purpose of discussion, the method 500 will be described with reference to FIGS. 1 and 6A-6B.

At 510, the terminal device 120 determines whether there is a beam failure on a Scell. If the terminal device 120 determines a beam failure on the Scell 102, the terminal device 120 at 520 determines an uplink control channel of a Pcell to be used, based on resources of the uplink control channel and uplink control information to be transmitted on the uplink control channel. The terminal deice 120 may determine a PUCCH of the Pcell 101 to be used.

Figure 6A:
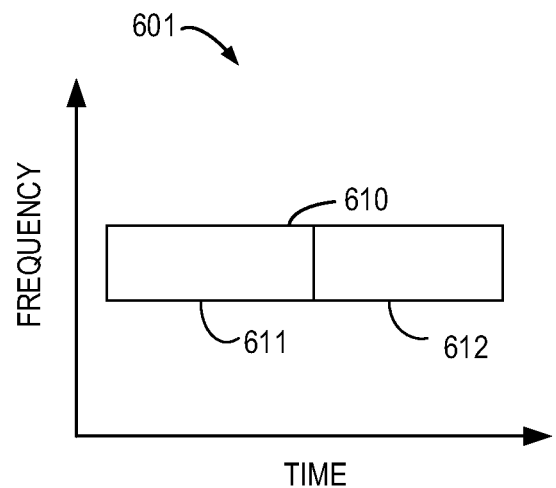
FIGS. 6A and 6B are schematic diagrams illustrating padding beam failure request in a PUCCH according to some embodiments of the present disclosure.
Figure 6B:
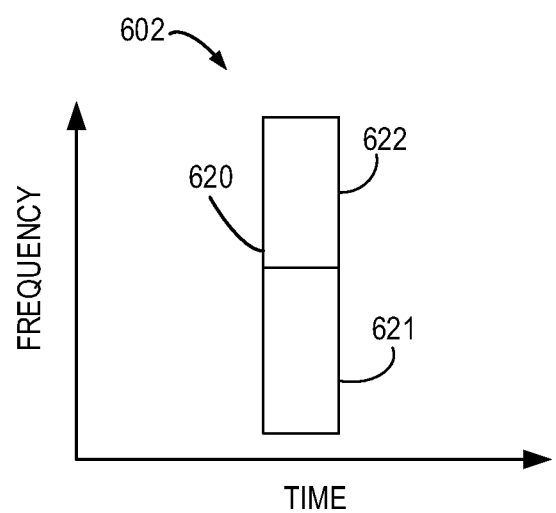

Refer to FIGS. 6A and 6B, which are schematic diagrams illustrating padding beam failure request in a PUCCH according to some embodiments of the present disclosure. Diagrams 601 and 602 show a long-PUCCH (L-PUCCH) 610 and a short-PUCCH (S-PUCCH) 620. As an example, the terminal device 120 may determine to use the L-PUCCH 610 to pad the beam failure recovery request. For example, a first portion 611 of the L-PUCCH 610 may be used to transmit the UCI and a second portion of the L-PUCCH 610 may be used to transmit the beam failure recovery request.

In some embodiments, the terminal device 120 may determine the PUCCH to be used based on the remaining resource blocks. The terminal device 120 may first determine a first number of physical resource blocks (PRBs) that are allocated to the uplink control channel. For example, the terminal device 120 may determine the number of PRBs allocated to the L-PUCCH 610 to be $M_{RB}^{PUCCH}$. The terminal device 120 may then determine a second number of PRBs to be used by the UCI. For example, the terminal device 120 may determine, based on information included in the UCI, the number of PRBs to be used by the UCI as $M_{RB,selected}^{PUCCH}$. That is, the number of PRBs corresponding to the first portion 611 is $M_{RB,selected}^{PUCCH}$. Then, a third number $M_r$ of PRBs that can be used to transmit the beam failure recovery request is determined by the following equation:

$$M_r = M_{RB}^{PUCCH} - M_{RB,selected}^{PUCCH} \qquad (1)$$

$M_r$ represents the number of PRBs corresponding to the second portion 612. If $M_r$ is determined to be equal to or greater than a threshold number, the terminal device 120 may determine the L-PUCCH 610 as a channel to transmit the beam failure recovery request. The threshold number may be predetermined based on the size of the beam failure recovery request.

It is to be understood that other information such as CSI report may also be transmitted in the uplink control channel. In this event, the PRBs occupied by the other information should be considered into the determined $M_{RB,selected}^{PUCCH}$. Diagram 602 shows a S-PUCCH 602 along with its first portion 621 and second portion 622. The terminal device 120 may determine to use the second portion 622 to transmit the beam failure recovery request in a similar manner described with respect to the L-PUCCH 610.

Still referring to FIG. 5, at 530, the terminal device 120 transmits, to a network device and on the uplink control channel, a beam failure recovery request along with the uplink control information. The terminal device 120 may transmit, to the network device 110, the beam failure recovery request in the second portion 612 or 622 and the UCI in the first portion 611 or 621. The beam failure recovery request comprises a Scell index of the Scell 102 and a beam index of a beam selected from available beams on the Scell 102 by the terminal device 120. The beam failure recovery request is transmitted to recover communication between the terminal device 120 and the network device 110 via the selected beam 111 on the Scell 102.

In some embodiments, after transmitting the beam failure recovery request on the uplink control channel, the terminal device 120 may initiate a timer for monitoring a response to the beam failure recovery request, i.e., start a BFR-RA-window. If the timer has expired or the BFR-RA-window ends but no response to the beam failure request has been received, the terminal device 120 may retransmit the beam failure recovery request to the network device 110.

In some embodiments, the terminal device 120 may receive from the network device 110 a new data transmission associated with the same HARQ ID as the ACK/NACK transmitted at 530. In this case, the beam failure recovery request may be considered to have been received by the network device 110. Thus, the terminal device 120 may end up the BFR-RA-window, resulting in a reduced BFR-RA-window.

In the embodiments described with respect to FIG. 5, the beam failure recovery procedure may utilize the remaining resources of a PUCCH which otherwise would be wasted. In this way, the transmission of the beam failure request may not require dedicated resources. Thus, the overhead for the beam failure recovery can be further reduced while improving the efficiency of the beam failure recovery.

FIGS. 7-11 illustrate example methods for according to some embodiments of the present disclosure implemented at a network device. It is to be understood that the methods shown may include additional acts not shown and/or may omit some shown acts, and the scope of the present disclosure is not limited in this regard.

Figure 7:
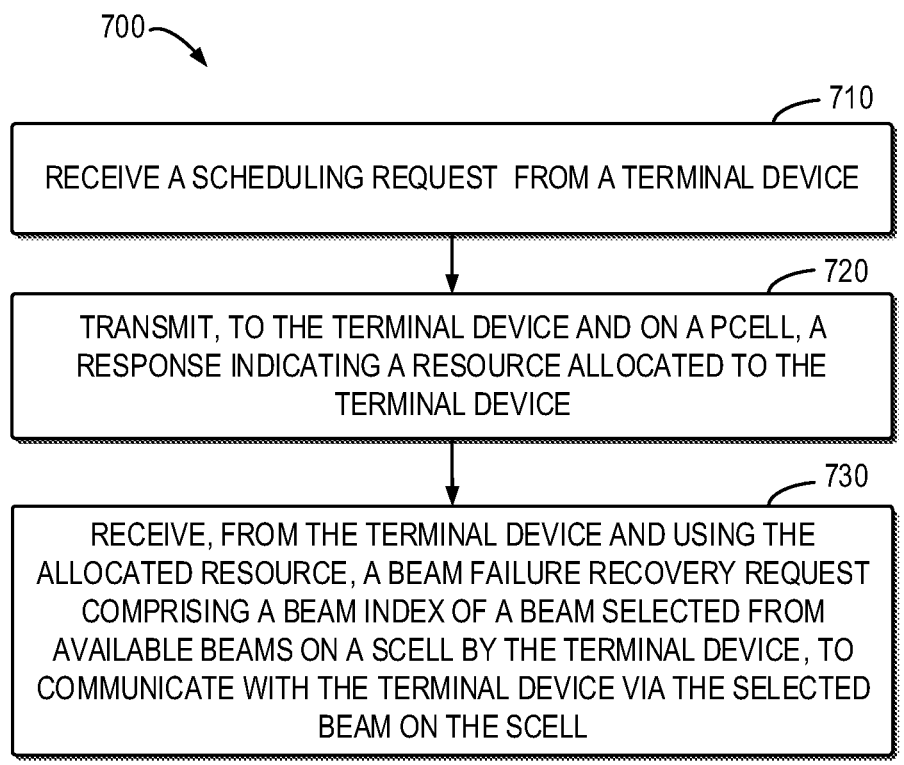
FIG. 7 illustrates a flowchart of a method in accordance with some embodiments of the present disclosure.

FIG. 7 illustrates a flowchart of an example method 700 for beam failure recovery for a Scell in accordance with some embodiments of the present disclosure. The method 700 can be implemented at the network device 110 shown in FIG. 1. For the purpose of discussion, the method 700 will be described with reference to FIG. 1.

At 710, the network device 110 receives a scheduling request from a terminal device, e.g. the terminal device 120. As described with respect to FIG. 2, the scheduling request may be a PRACH transmission received on the Pcell 101 or Scell 102. Alternatively, the scheduling request may be a scheduling request received on a PUCCH of the Pcell 101.

At 720, the network device 110 transmits, to the terminal device and on a primary cell (e.g. the Pcell 101), a response indicating a resource allocated to the terminal device 120. The response may comprise downlink control information indicating a UL grant. Depending on the type of the scheduling request transmitted at 220, the downlink control information may be scrambled by different types of RNTI, such as RA-RNTI determined by a PRACH transmission occasion or C-RNTI allocated to the terminal device. The embodiments where different types of response are transmitted will be described below with respect to FIGS. 11-13.

At 730, the network device 110 receive, from the terminal device 120 and using the allocated resource, a beam failure recovery request comprising a beam index of a beam selected from available beams on a Scell by the terminal device 120, to communicate with the terminal device 120 via the selected beam 111 on the Scell 102. For example, the Scell index and the beam index may be included in MAC CE received using the allocated resources, e.g. PUSCH.

After receiving the beam failure recovery request, the network device 110 may use the selected beam 111 rather than the previous beam 112 to communicate with the terminal device 120 on the Scell 102.

In some embodiments, the network device 110 may transmit, to the terminal device 120, a further response to the beam failure recovery request on the Scell 102. For example, the network device 110 may transmit the response via the selected beam 111.

Figure 8:
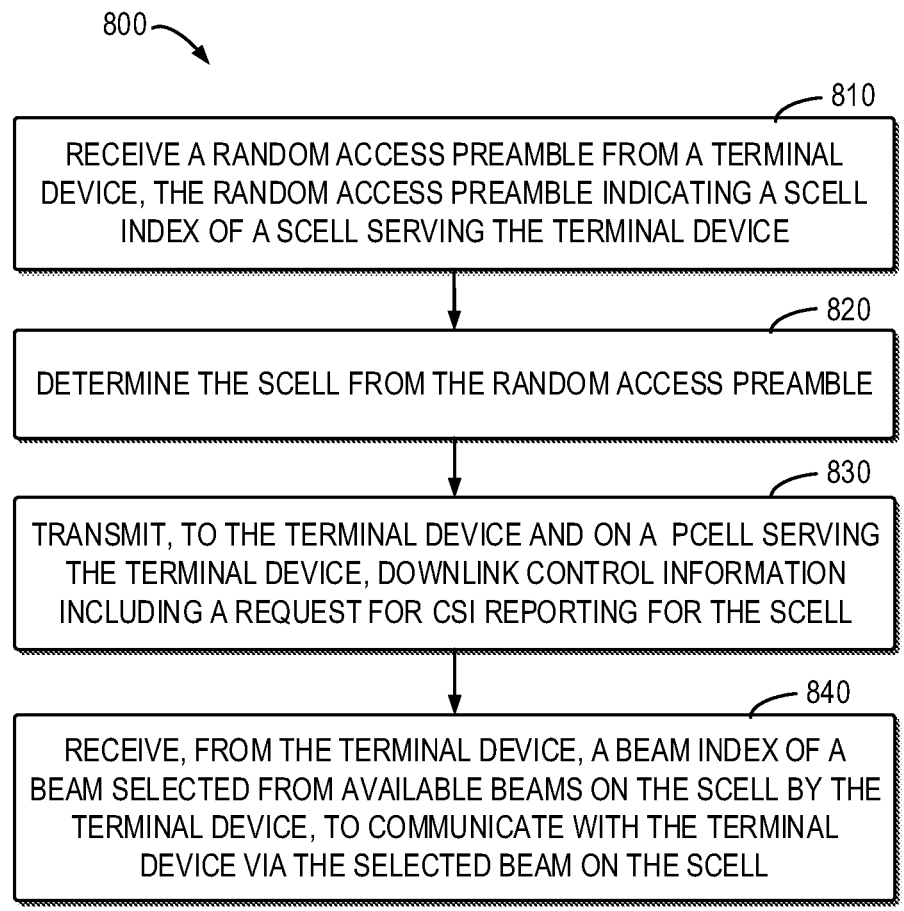
FIG. 8 illustrates a flowchart of a method in accordance with some embodiments of the present disclosure.

FIG. 8 illustrates a flowchart of an example method 800 for beam failure recovery for a Scell in accordance with some embodiments of the present disclosure. The method 800 can be implemented at the network device 110 shown in FIG. 1. For the purpose of discussion, the method 800 will be described with reference to FIG. 1.

At 810, the network device 110 receives a PRACH preamble in a dedicated PRACH transmission on Pcell from a terminal device, for example the terminal device 120. The PRACH preamble index indicates a Scell index of a Scell (e.g. Scell 102) serving the terminal device 120.

At 820, the network device 110 determines the Scell 102 from the PRACH preamble. For example, the network device 110 may determine the Scell 102 based on a predefined mapping relation between the PRACH preambles and the at least one Scell provided by the network device 110 to the terminal device 120.

At 830, the network device 110 transmits, to the terminal device 120 and on a Pcell serving the terminal device 120, downlink control information including a request for CSI reporting for the Scell 102. The downlink control information may be scrambled with C-RNTI corresponding to the terminal device.

At 840, the network device 110 receives, from the terminal device 120, a beam index of a beam selected from available beams on the Scell 102 by the terminal device 120. The beam index of the selected beam 111 may be included in a CSI report which is received on the PUSCH of the Pcell 101.

In such embodiments, the Scell index of the Scell on which a beam failure has occurred is implicitly included in the PRACH preamble. Thus, after receiving the beam index of the selected beam 111, the network device 110 may use the selected beam 111 to communicate with the terminal device 120 on the Scell 102 determined at 820.

Figure 9:
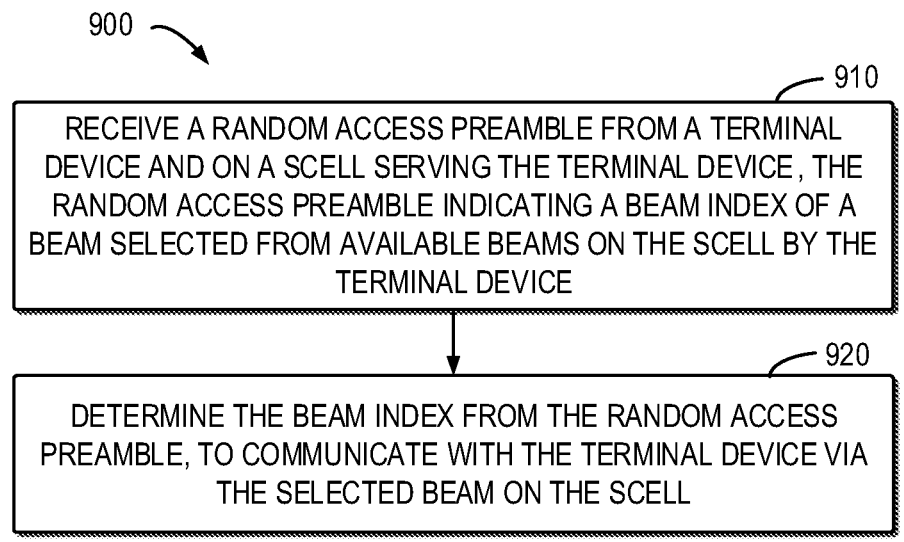
FIG. 9 illustrates a flowchart of a method in accordance with some embodiments of the present disclosure.

FIG. 9 illustrates a flowchart of an example method 900 for beam failure recovery for a Scell in accordance with some embodiments of the present disclosure. The method 900 can be implemented at the network device 110 shown in FIG. 1. For the purpose of discussion, the method 900 will be described with reference to FIG. 1.

At 910, the network device 110 receives a dedicated PRACH transmission from a terminal device and on a Scell serving the terminal device. For example, the network device 110 may receive the PRACH preamble on the Scell 102 serving the terminal device 120. The PRACH preamble index indicates a beam index of a beam selected from available beams on the Scell by the terminal device 120.

At 920, the network device 110 determines the beam index from the PRACH preamble received at 910. For example, the network device 110 may determine the beam index based on a predefined mapping relation between the PRACH preambles and a plurality of beams associate with the Scell 102.

In such embodiments since the PRACH preamble is received on the Scell 102, the network device 110 may determine that a beam failure has occurred on this Scell without dedicated information on the Scell index. After determining the candidate beam (e.g. the selected beam 111) selected by the terminal device 120, the network device may communicate with the terminal device 120 via the selected beam 111 on the Scell 102. In some embodiments, the network device 11 may transmit a beam failure recovery response to the terminal device 120 via the selected beam 111.

As described with respect to FIG. 5, the beam failure recovery request may be padded in a PUCCH of a Pcell.

Figure 10:
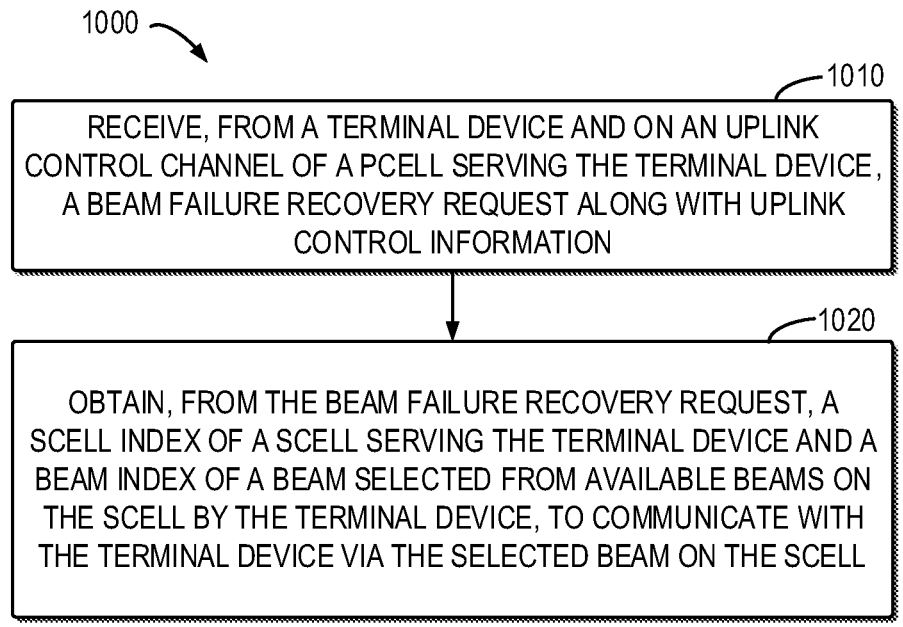
FIG. 10 illustrates a flowchart of a method in accordance with some embodiments of the present disclosure.

FIG. 10 illustrates a flowchart of an example method 1000 for beam failure recovery for a Scell in accordance with some embodiments of the present disclosure. The method 1000 can be implemented at the network device 110 shown in FIG. 1. For the purpose of discussion, the method 1000 will be described with reference to FIGS. 1 and 6A-6B.

At 1010, the network device 110 receives, from a terminal device and on an uplink control channel of a Pcell serving the terminal device, a beam failure recovery request along with uplink control information. For example, the network device 110 may receive the L-PUCCH 610 shown in FIG. 6A from the terminal device 120. The UCI may be included in the first portion 611 and the beam failure recovery request may be included in the second portion 612. The UCI may be associated with data previously transmitted to the terminal device 120. For example, the UCI may include HARQ ACK/NACK information.

At 1020, the network device 110 obtains, from the beam failure recovery request, a Scell index of a Scell serving the terminal device and a beam index of a beam selected from available beams on the Scell by the terminal device. The network device 110 may obtain the Scell index of the Scell 102 and the beam index of the selected beam 111. Thus, the network device 110 may determine that a beam failure has occurred on the Scell 102 and a new beam has been selected by the terminal device 120. Then, the network device 110 may communicate with the terminal device 120 via the selected beam 111 on the Scell 102.

Figure 11:
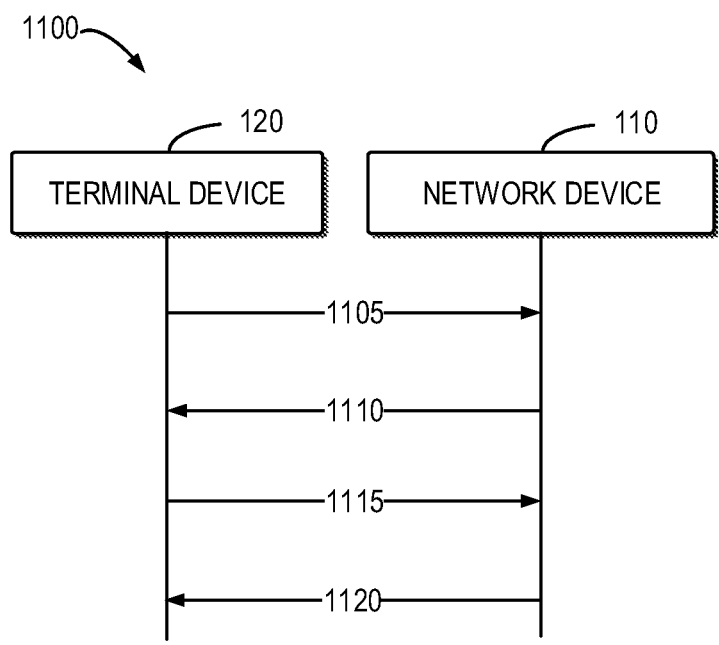
FIG. 11 is a flowchart illustrating a process according to some embodiments of the present disclosure.
Figure 12:
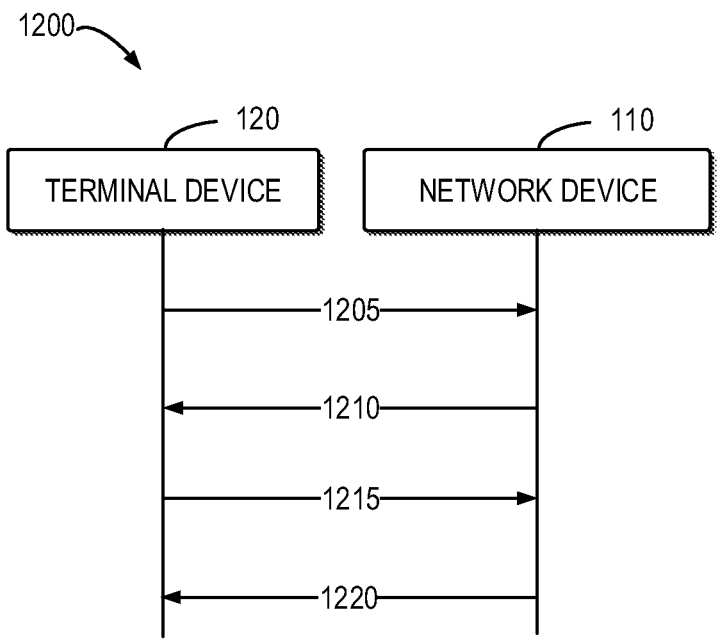
FIG. 12 is a flowchart illustrating a process according to some embodiments of the present disclosure.
Figure 13:
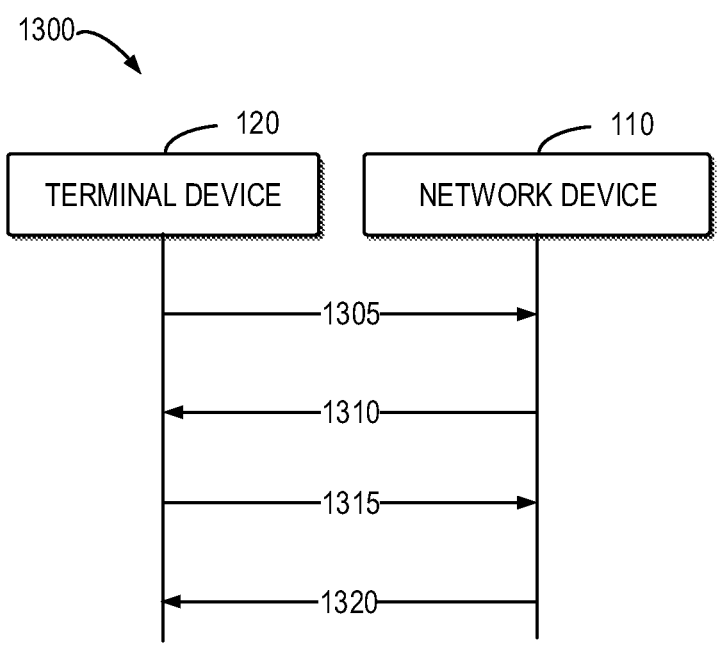
FIG. 13 is a flowchart illustrating a process according to some embodiments of the present disclosure.

As mentioned above, the scheduling request may be a PRACH preamble on the Pcell or Scell, or it may be a scheduling request on PUCCH. FIGS. 11-13 are flowcharts illustrating processes for beam failure recovery for a Scell according to some embodiments of the present disclosure. The processes described with respect to FIGS. 11-13 may be considered as implementations of the methods descried with respect to FIGS. 2 and 7.

FIG. 11 is a flowchart illustrating process 1100 for beam failure recovery for a Scell according to some embodiments of the present disclosure. For the purpose of discussion, the process 1100 will be described with reference to FIG. 1. The process 1100 may involve the network device 110 and the terminal device 120 in FIG. 1.

After detecting a beam failure on the Scell 102 and identifying the selected beam 111, the terminal device may initiate a beam failure recovery procedure. In this implementation, the beam failure recovery procedure may be a normal random access procedure. The terminal device 120 transmits 1105 a random access preamble on the Pcell 101 to the network device 110.

Once receiving the random access preamble, the network device 110 transmits 1110 a random access response (RAR) to the terminal device 120 on the Pcell 101. The RAR may be scrambled with RA-RNTI and include downlink control information with UL grant to allocate uplink resources for the terminal device 120.

After receiving the RAR, the terminal device 120 transmits 1115 MAC CE to the network device 110 and using the allocated resources (e.g. on PUSCH). The MAC CE may include the Scell index of the Scell 102 and the beam index of the selected beam 111. If the MAC CE is successfully received, the network device 110 transmits 1120 a beam failure recovery request response to the terminal device 120.

FIG. 12 is a flowchart illustrating process 1200 for beam failure recovery for a Scell according to some embodiments of the present disclosure. For the purpose of discussion, the process 1200 will be described with reference to FIG. 1. The process 1200 may involve the network device 110 and the terminal device 120 in FIG. 1.

After detecting a beam failure on the Scell 102 and identifying the selected beam 111, the terminal device may initiate a beam failure recovery procedure. In this implementation, the beam failure recovery procedure may be a normal random access procedure. The terminal device 120 transmits 1205 a random access preamble on the Scell 102 to the network device 110.

Once receiving the random access preamble, the network device 110 transmits 1210 a random access response (RAR) to the terminal device 120 on the Pcell 101. The RAR may be scrambled with RA-RNTI and include downlink control information with UL grant to allocate uplink resources for the terminal device 120.

After receiving the RAR, the terminal device 120 transmits 1215 MAC CE to the network device 110 and using the allocated resources (e.g. on PUSCH). In this case, the MAC CE may include the beam index of the selected beam 111 and the Scell index of the Scell 102 may be omitted. If the MAC CE is successfully received, the network device 110 transmits 1220 a beam failure recovery request response to the terminal device 120.

FIG. 13 is a flowchart illustrating process 1300 for beam failure recovery for a Scell according to some embodiments of the present disclosure. For the purpose of discussion, the process 1300 will be described with reference to FIG. 1. The process 1300 may involve the network device 110 and the terminal device 120 in FIG. 1.

After detecting a beam failure on the Scell 102 and identifying the selected beam 111, the terminal device may initiate a beam failure recovery procedure. In this implementation, the terminal device 120 may initiate an explicit procedure for triggering a UL grant to transmit the beam failure recovery request. The terminal device 120 transmits 1305, to the network device 110, a scheduling request (SR) on an uplink control channel of the Pcell 101. The terminal device 120 may transmit the SR on the PUCCH of the Pcell 101.

Once receiving the SR, the network device 110 transmits 1310, to the terminal device 120 on the Pcell 101, a response to the SR. The response to the SR may be scrambled with C-RNTI allocated to the terminal device and include downlink control information with UL grant to allocate uplink resources for the terminal device 120.

After receiving the response to the SR, the terminal device 120 transmits 1315 MAC CE to the network device 110 and using the allocated resources (e.g. on PUSCH). The MAC CE may include the Scell index of the Scell 102 and the beam index of the selected beam 111. If the MAC CE is successfully received, the network device 110 transmits 1320 a beam failure recovery request response to the terminal device 120.

Figure 14:
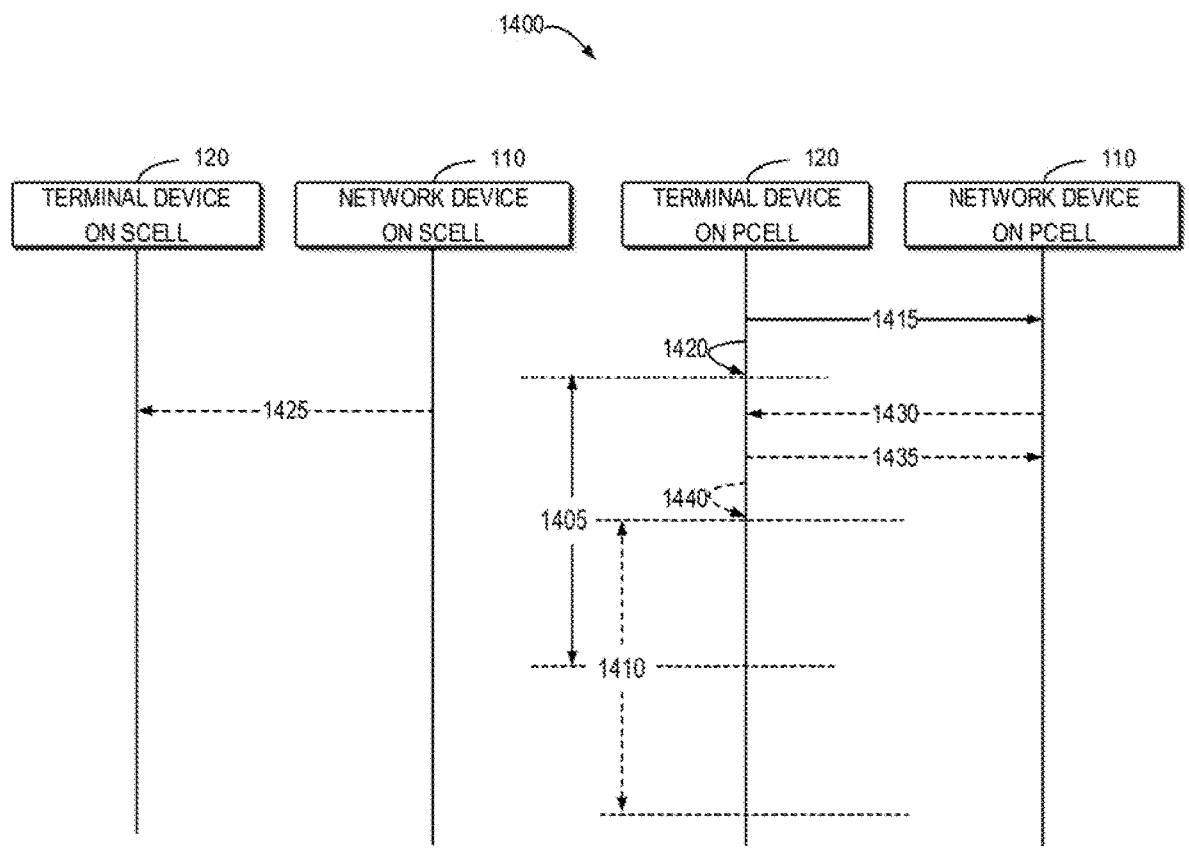
FIG. 14 is a schematic diagram illustrating a BFR-RA window for beam failure recovery according to some embodiments of the present disclosure.

FIG. 14 is a schematic diagram 1400 illustrating a BFR-RA window for beam failure recovery according to some embodiments of the present disclosure. In some embodiments, after transmitting 1415 the MAC CE on the Pcell 101 to the network device 110, the terminal device 120 may initiate 1420 a timer for monitoring a response to the beam failure recovery request (also referred to as BFR response). That is, the terminal device 120 may start the BFR-RA-window 1405. It is to be understood that the action of transmitting 1415 the MAC CE may refer to the actions described above with respect to 1115 shown in FIG. 11, 1215 shown in FIG. 12 and 1315 shown in FIG. 13.

In some embodiments, the terminal device 120 may receive 1425 the BFR response on the Scell 102 (or on the Pcell), which implies the beam failure is successfully recovered. The terminal device 120 may terminate the beam failure recovery procedure and may end up the BFR-RA-window 1405.

In some embodiments, the terminal device 120 may receive 1430 from the network device 110 downlink control information on rescheduling PUSCH containing the MAC CE, i.e. reschedule of the beam failure recovery request. Then, the terminal device 120 may retransmit 1435 the beam failure recovery request in the MAC CE on PUSCH to the network device 110. Following the retransmission, the terminal device 120 may initiate 1440 the timer. Thus, a new BFR-RA-window 1410 may be started. Note that with the starting of the new BFR-RA-window 1410, the BFR-RA-window 1405 may be discarded.

If the BFR-RA-window 1405 or 1410 (depending on which one is valid) has expired or ends, but no BFR response has been received, then the terminal device 120 may terminate the beam failure recovery procedure without retransmitting the beam failure recovery request. The terminal device 120 may further indicate to higher layer of an unsuccessful beam failure recovery.

In such cases, there is no need to retransmit the beam failure recovery request for the following reasons. The network device 110 may has received the beam failure recovery request but does not respond to it. The network device 110 may have responded on the Scell but the selected beam 111 is not good enough such that the terminal device 120 cannot receive the BFR response. There also may be another situation where the MAC CE including the beam failure recovery request is not received by the network device 110.

Figure 15:
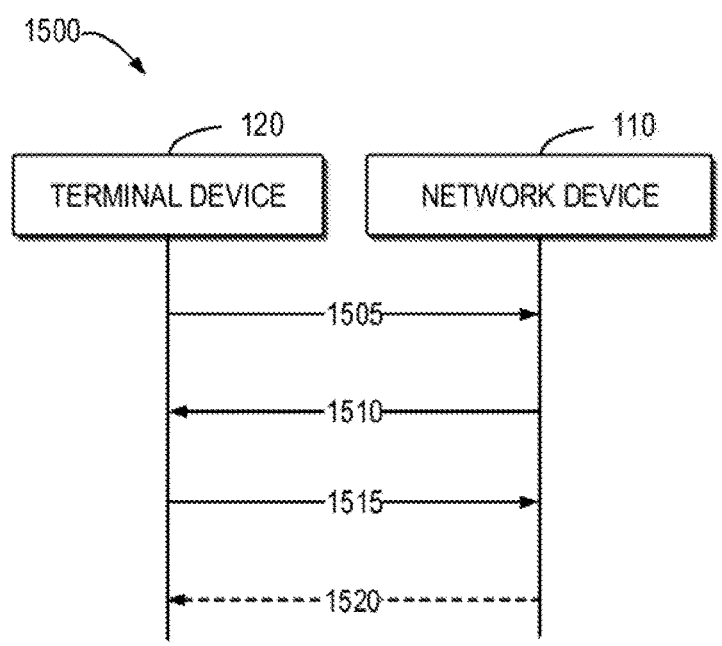
FIG. 15 is a flowchart illustrating a process according to some embodiments of the present disclosure.
Figure 16:
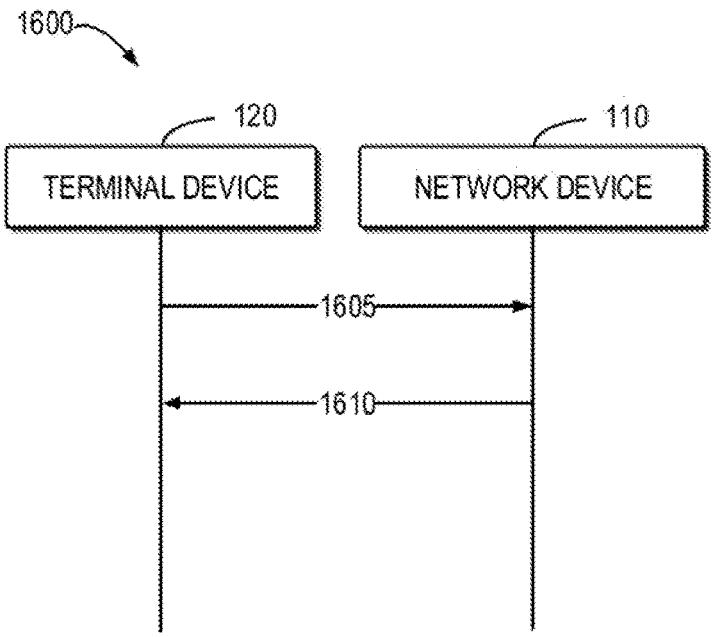
FIG. 16 is a flowchart illustrating a process according to some embodiments of the present disclosure.

As mentioned above, the scheduling request may be transmitted with a dedicated PRACH preamble. FIGS. 15-16 are flowcharts illustrating processes for beam failure recovery for a Scell according to some embodiments of the present disclosure.

FIG. 15 is a flowchart illustrating process 1500 for beam failure recovery for a Scell according to some embodiments of the present disclosure. For the purpose of discussion, the process 1500 will be described with reference to FIG. 1. The process 1500 may involve the network device 110 and the terminal device 120 in FIG. 1. The process 1500 may refer to an implementation of the methods described with respect to FIGS. 3 and 8.

After detecting a beam failure on the Scell 102 and identifying the selected beam 111, the terminal device may initiate a beam failure recovery procedure. In this implementation, the beam failure recovery procedure may be a dedicated random access procedure. The terminal device 120 transmits 1505 a random access preamble on the Pcell 101 to the network device 110. The random access preamble index indicates a Scell index of the Scell 102. For example, the random access preamble may be determined by the terminal device 120 based on a predefined mapping relation between the random access preambles and the at least one Scell provided by the network device 110.

Once receiving the random access preamble, the network device 110 transmits 1510 a response to the terminal device 120 on the Pcell 101. Unlike the normal RAR, this response may be scrambled with C-RNTI on a dedicated coreset, and may include downlink control information with request for CSI report for the Scell 102. For example, this response may include CSI request for the Scell 102.

After receiving the response, the terminal device 120 transmits 1515 a CSI report to the network device 110 and using the allocated resources on PUSCH depending on the CSI request. The CSI report may include the beam index of the selected beam 111. Note that the Scell index of the Scell 102 may be optional, since the index on the Scell has been indicated by the random access preamble.

In some embodiments, if the CSI report is successfully received, the network device 110 transmits 1520 a beam failure recovery response to the terminal device 120.

FIG. 16 is a flowchart illustrating process 1600 for beam failure recovery for a Scell according to some embodiments of the present disclosure. For the purpose of discussion, the process 1600 will be described with reference to FIG. 1. The process 1600 may involve the network device 110 and the terminal device 120 in FIG. 1. The process 1600 may refer to an implementation of the methods described with respect to FIGS. 4 and 9.

After detecting a beam failure on the Scell 102 and identifying the selected beam 111, the terminal device may initiate a beam failure recovery procedure. In this implementation, the beam failure recovery procedure may be another dedicated random access procedure. The terminal device 120 transmits 1605 a random access preamble on the Scell 102 to the network device 110.

This random access preamble indicates a beam index of a beam selected from available beams on the Scell 102 by the terminal device 120. For example, random access preamble indicates the beam index of the selected beam 111. The random access preamble may be determined by the terminal device 120 based on a predefined mapping relation between the random access preambles and a plurality of beams associate with the Scell 102.

Once receiving the random access preamble, the network device 110 determines the Scell on which a beam failure has occurred and the candidate beam selected by the terminal device 120. The network device 110 transmits 1610 a BFR response to the terminal device 120. In such embodiments, only two messages between the network device 110 and the terminal device 120 are required in the beam failure recovery procedure. which can improve the efficiency of beam failure recovery.

Figure 17:
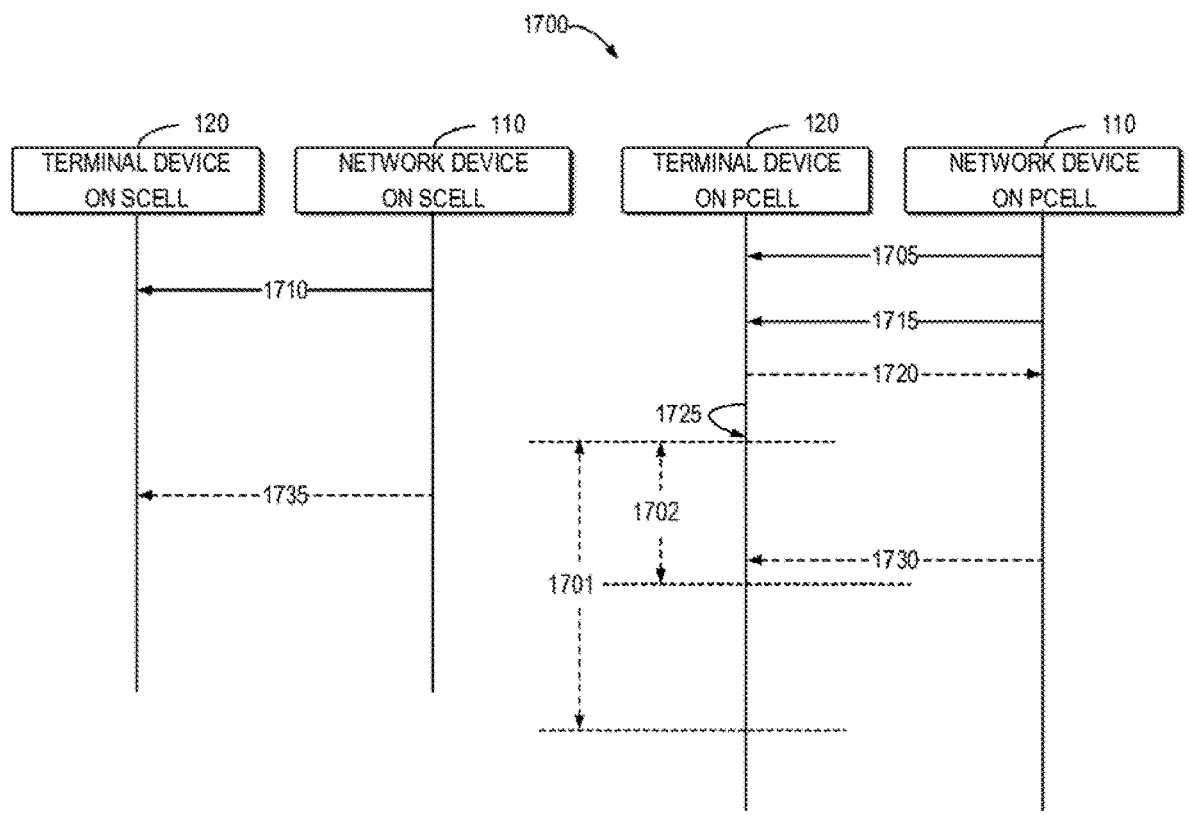
FIG. 17 is a flowchart illustrating a process according to some embodiments of the present disclosure.

FIG. 17 is a schematic diagram 1700 illustrating a process 1700 for beam failure recovery according to some embodiments of the present disclosure. For the purpose of discussion, the process 1700 will be described with reference to FIGS. 1 and 6A. The process 1700 may involve the network device 110 and the terminal device 120 in FIG. 1. The process 1700 may refer to an implementation of the methods described with respect to FIGS. 5 and 10.

The network device 110 transmits 1705 downlink control information to the terminal device 120 and transmits 1715 data on a PDSCH of the Pcell 101. At certain time, a beam failure 1710 may occur on the Scell 102. After detecting the beam failure 1710 on the Scell 102 and identifying the selected beam 111, the terminal device need to transmit a beam failure recovery request including the Scell index of the Scell 102 and the beam index of the selected beam 111 to the network device 110. Meanwhile, the terminal device 120 also needs to transmit UCI to the network device 110. As described above, the terminal device 120 may include the beam failure recovery request along with the UCI in the PUCCH (such as the long PUCCH "L-PUCCH" or short PUCCH "S-PUCCH" as shown in FIGS. 6A and 6B) allocated to transmitted the UCI. The UCI may include HARQ ACK/NACK related to the data transmitted at 1715. Then, the terminal device 120 transmits 1720 the beam failure recovery request along with the UCI on the PUCCH of the Pcell 101.

In some embodiments, after transmitting 1720 the PUCCH, the terminal device 120 may initiate 1725 a timer for monitoring a response to the beam failure recovery request (also referred to as BFR response). That is, the terminal device 120 may start the BFR-RA-window 1701.

In some embodiments, the terminal device 120 may receive 1735 the BFR response on the Scell 102 (or on the Pcell), which implies the beam failure is successfully recovered. The terminal device 120 may terminate the beam failure recovery procedure and may end up the BFR-RA-window 1701.

If the BFR-RA-window 1701 has expired or ends, but no BFR response has been received, then the terminal device 120 may retransmit the beam failure recovery request to the network device 110. Unlike the implementations described above with respect to FIG. 14, retransmission of the beam failure recovery request is required when the BFR-RA-window has expired.

In some embodiments, the terminal device 120 may receive 1730 new data from the network device 110. The new data may be associated with the same HARQ ID as the HARQ ACK/NACK transmitted at 1720. In this event, the beam failure recovery request may be considered to have been successfully received by the network device 110. Thus, the terminal device 120 may terminate the BFR-RA-window 1701, resulting in a reduced BFR-RA-window 1730.

Figure 18:
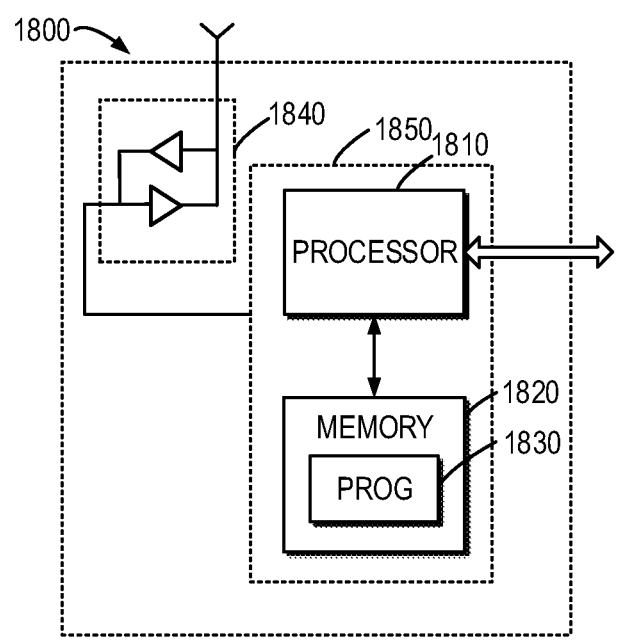
FIG. 18 is a simplified block diagram of a device that is suitable for implementing embodiments of the present disclosure.

FIG. 18 is a simplified block diagram of a device 1800 that is suitable for implementing embodiments of the present disclosure. The device 1800 can be considered as a further example implementation of a network device 110 or a terminal device 120 as shown in FIG. 1. Accordingly, the device 1800 can be implemented at or as at least a part of the network device 110 or the terminal device 120.

As shown, the device 1800 includes a processor 1810, a memory 1820 coupled to the processor 1810, a suitable transmitter (TX) and receiver (RX) 1840 coupled to the processor 1810, and a communication interface coupled to the TX/RX 1840. The memory 1810 stores at least a part of a program 1830. The TX/RX 1840 is for bidirectional communications. The TX/RX 1840 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1830 is assumed to include program instructions that, when executed by the associated processor 1810, enable the device 1800 to operate in accordance with the embodiments of the present disclosure, as discussed herein with reference to FIGS. 2 to 5 and FIGS. 7 to 10. The embodiments herein may be implemented by computer software executable by the processor 1810 of the device 1800, or by hardware, or by a combination of software and hardware. The processor 1810 may be configured to implement various embodiments of the present disclosure. Furthermore, a combination of the processor 1810 and memory 1810 may form processing means 1850 adapted to implement various embodiments of the present disclosure.

The memory 1810 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1810 is shown in the device 1800, there may be several physically distinct memory modules in the device 1800. The processor 1810 may be of any type suitable to the local technical network, and may include one or more of general purpose computers, special purpose computers, microprocessors, digital signal processors (DSPs) and processors based on multicore processor architecture, as non-limiting examples. The device 1800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2-5 and FIGS. 7-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a terminal device, the method comprising:
   in response to a beam failure on a secondary cell (Scell), transmitting a scheduling request to a network device;
   receiving, from the network device and on a primary cell (Pcell), a response indicating a resource allocated to the terminal device;
   transmitting, to the network device and using the allocated resource, a beam failure recovery request comprising a beam index of a beam selected from available beams on the Scell by the terminal device; and
   receiving information for a Hybrid Automatic Repeat request (HARQ) identification that is based on the beam failure recovery request.

2. The method of claim 1, wherein transmitting the scheduling request comprises transmitting a random access preamble on the Pcell,
   wherein receiving the response comprises receiving downlink control information with an uplink grant, and
   wherein transmitting the beam failure recovery request comprises transmitting the beam index and a Scell index of the Scell in media access control (MAC) control element (CE).

3. The method of claim 1, wherein transmitting the scheduling request comprises transmitting a random access preamble on the Scell,
   wherein receiving the response comprises receiving downlink control information with an uplink grant, and
   wherein transmitting the beam failure recovery request comprises transmitting the beam index in media access control (MAC) control element (CE).

4. The method of claim 1, wherein transmitting the scheduling request comprises transmitting the scheduling request on an uplink control channel of the Pcell,
   wherein receiving the response comprises receiving downlink control information with an uplink grant, and
   wherein transmitting the beam failure recovery request comprises transmitting the beam index and a Scell index of the Scell in media access control (MAC) control element (CE).

5. The method of claim 1, further comprising:
   in response to receiving from the network device downlink control information on reschedule of the beam failure recovery request, retransmitting the beam failure recovery request to the network device; and
   initiating a timer for monitoring a response to the beam failure recovery request.

* * * * *